(12) United States Patent
Amitai

(10) Patent No.: US 7,577,326 B2
(45) Date of Patent: Aug. 18, 2009

(54) OPTICAL DEVICE FOR LIGHT COUPLING

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 0 days.

(21) Appl. No.: 11/573,182

(22) PCT Filed: Aug. 4, 2005

(86) PCT No.: PCT/IL2005/000830

§ 371 (c)(1), (2), (4) Date: Feb. 2, 2007

(87) PCT Pub. No.: WO2006/013565

PCT Pub. Date: Feb. 9, 2006

(65) Prior Publication Data

US 2008/0025667 A1    Jan. 31, 2008

(30) Foreign Application Priority Data

Aug. 5, 2004  (IL) ..................................... 163361

(51) Int. Cl.
*G02B 6/34* (2006.01)
*G02B 6/26* (2006.01)
*G02B 27/14* (2006.01)

(52) U.S. Cl. .............................. 385/36; 385/31; 359/636
(58) Field of Classification Search ....................... None
See application file for complete search history.

(56) References Cited

U.S. PATENT DOCUMENTS

| 5,076,664 | A | 12/1991 | Migozzi |
| 6,222,676 | B1 | 4/2001 | Togino et al. |
| 6,324,330 | B1 * | 11/2001 | Stites .......................... 385/133 |
| 2003/0165017 | A1 | 9/2003 | Amitai |
| 2003/0218718 | A1 | 11/2003 | Moliton et al. |
| 2004/0137189 | A1 * | 7/2004 | Tellini et al. ................ 428/64.4 |
| 2005/0084210 | A1 * | 4/2005 | Cha ............................. 385/31 |
| 2005/0174658 | A1 * | 8/2005 | Long et al. .................. 359/833 |

FOREIGN PATENT DOCUMENTS

| EP | 1 385 023 A1 | 1/2004 |
| WO | WO 03/081320 | 10/2003 |

* cited by examiner

*Primary Examiner*—Tina M Wong

(57) ABSTRACT

There is provided an optical device, including a light-transmitting substrate having two major surfaces parallel to each other and two edges, optics for coupling light into the substrate by internal reflection. One of the edges is slanted with respect to the major surfaces and a portion of the optics for coupling light into the substrate is in contact with, or located adjacent to, the slanted edge.

39 Claims, 17 Drawing Sheets

Fig.19.

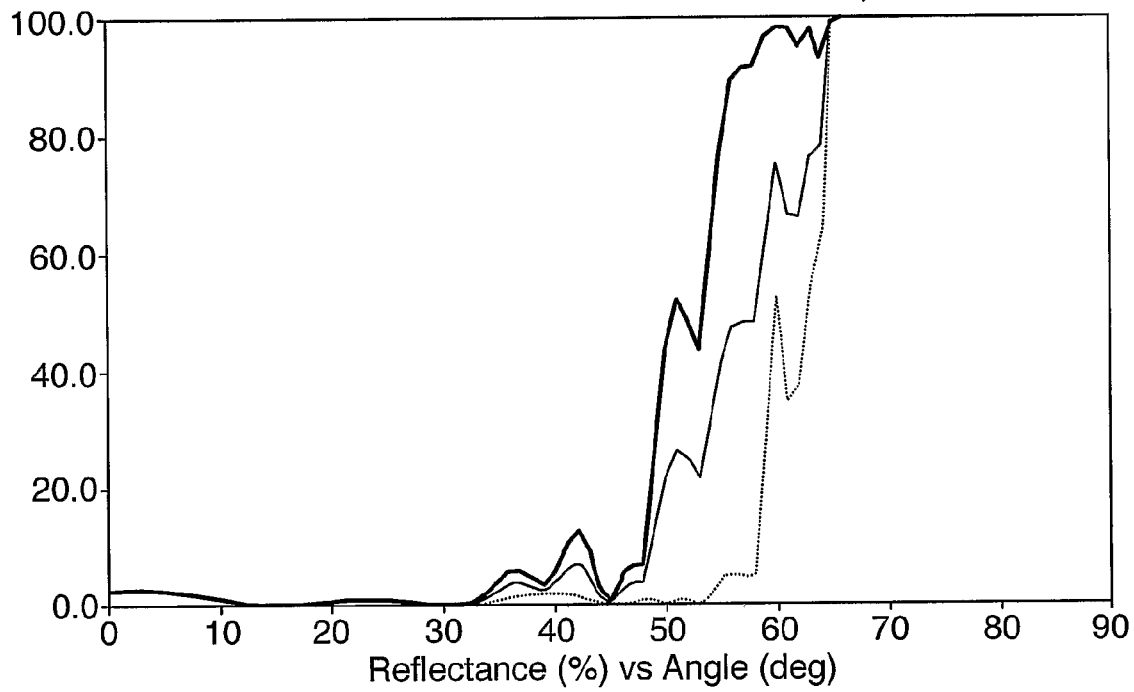

Illuminant: WHITE  Wavelength: 550.0 (nm)
Medium: BK7  Reference: 525.0 (nm)
Substrate BK7  Polarization: Ave— S— P·····
Exit: BK7  First Surface: Front
Detector: IDEAL  Remark: P-Polarized partial reflect. 29-37

Reflectance (%) vs Angle (deg)

Fig.20.

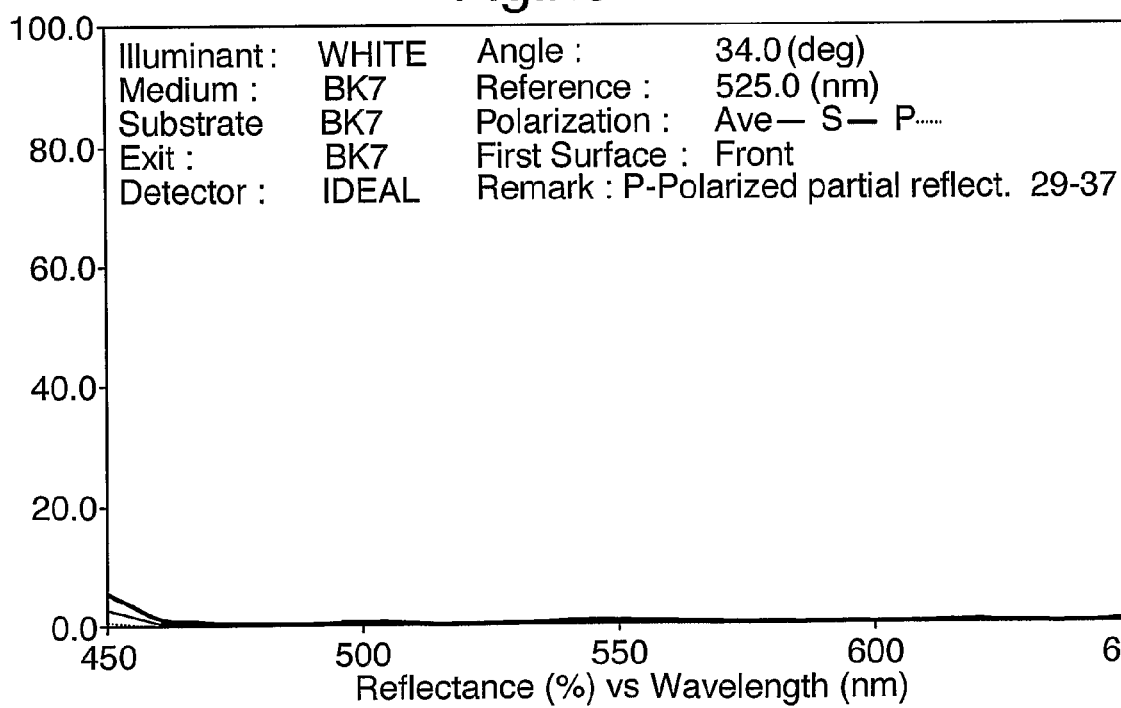

Illuminant: WHITE  Angle: 34.0 (deg)
Medium: BK7  Reference: 525.0 (nm)
Substrate BK7  Polarization: Ave— S— P·····
Exit: BK7  First Surface: Front
Detector: IDEAL  Remark: P-Polarized partial reflect. 29-37

Reflectance (%) vs Wavelength (nm)

| | | | |
|---|---|---|---|
| Illuminant | : WHITE | Wavelength : | 550.0 (nm) |
| Medium : | BK7 | Reference : | 525.0 (nm) |
| Substrate | BK7 | Polarization : | S— |
| Exit : | BK7 | First Surface : | Front |
| Detector : | IDEAL | Remark : P-Polarized partial reflect. 29-37 | |

Reflectance (%) vs Angle (deg)

Fig.29.

| | | | |
|---|---|---|---|
| Illuminant: | WHITE | Angle: | 34.0 (deg) |
| Medium: | BK7 | Reference: | 525.0 (nm) |
| Substrate | BK7 | Polarization: | S— |
| Exit: | BK7 | First Surface: | Front |
| Detector: | IDEAL | Remark: P-Polarized partial reflect. 29-37 | |

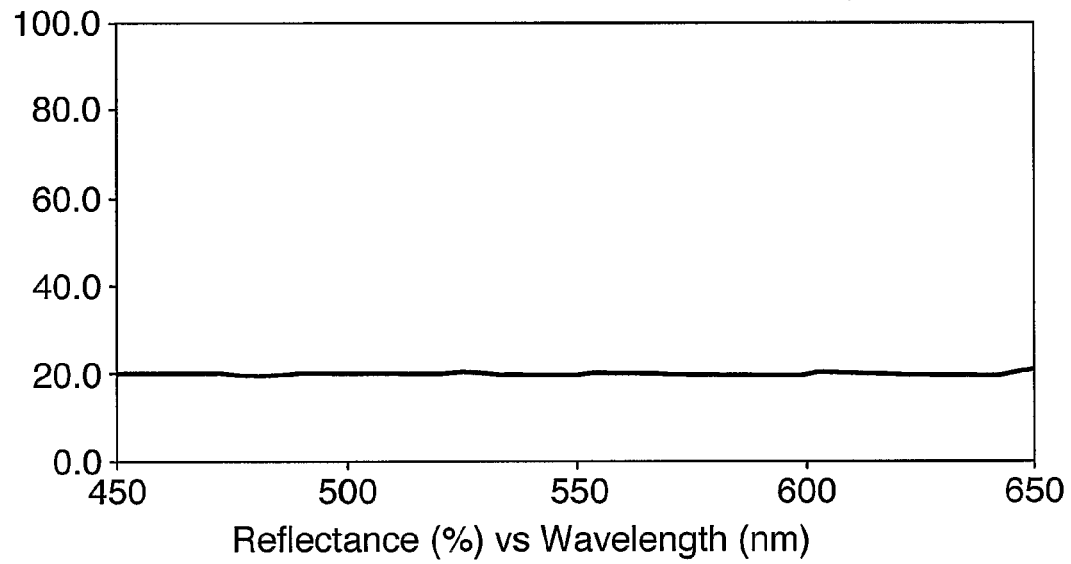

Reflectance (%) vs Wavelength (nm)

Fig.30.

| | | | |
|---|---|---|---|
| Illuminant: | WHITE | Angle: | 66.0 (deg) |
| Medium: | BK7 | Reference: | 525.0 (nm) |
| Substrate | BK7 | Polarization: | S— |
| Exit: | BK7 | First Surface: | Front |
| Detector: | IDEAL | Remark: P-Polarized partial reflect. 29-37 | |

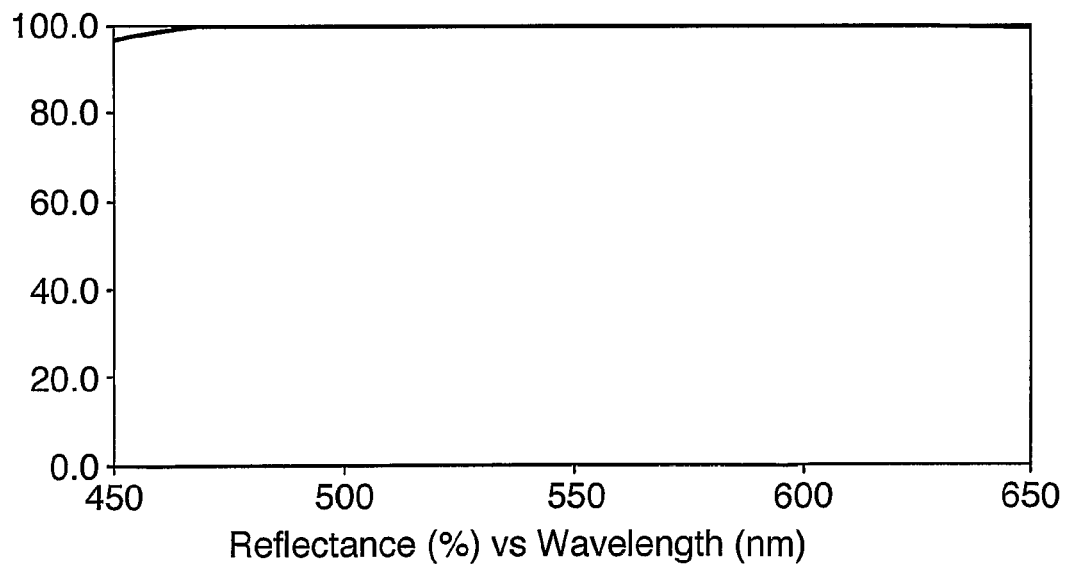

Reflectance (%) vs Wavelength (nm)

OPTICAL DEVICE FOR LIGHT COUPLING

FIELD OF THE INVENTION

The present invention relates to substrate-guided optical devices, and particularly to devices which include a plurality of reflecting surfaces carried by a common light-transmissive substrate, also referred to as a light-guide.

The invention can be implemented to advantage in a large number of imaging applications, such as, for example, head-mounted and head-up displays, cellular phones, compact displays, 3-D displays, compact beam expanders, as well as non-imaging applications such as flat-panel indicators, compact illuminators and scanners.

BACKGROUND OF THE INVENTION

One of the important applications for compact optical elements is in head-mounted displays (HMDs) wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier, bulkier and therefore, even for moderate performance device, impractical. This is a major drawback for all kinds of displays, but especially in head-mounted applications, wherein the system must necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small, typically, less than 8 mm. Hence, the performance of the optical system is very sensitive, even to small movements of the optical system relative to the eye of the viewer, and do not allow sufficient pupil motion for conveniently reading text from such displays.

DISCLOSURE OF THE INVENTION

The present invention facilitates the construction and fabrication of very compact light-guide optical elements (LOEs) for, amongst other applications, HMDs. The invention allows relatively wide FOV's together with relatively large EMB values. The resulting optical system offers a large, high-quality image which also accommodates large movements of the eye. The optical system of the present invention is particularly advantageous because it is substantially more compact than prior art implementations and yet it can readily be incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low-visibility landing operation. Furthermore, there have recently been numerous proposals and designs for HUDs in automotive applications where such systems can potentially assist the driver in driving and navigation. Nevertheless, prior art HUDs suffer several significant drawbacks. All currently used HUDs require a display source that must be offset a significant distance from the combiner to ensure that the source illuminates the entire combiner surface. As a result, the combiner-projector HUD system is necessarily bulky, and large, and requires considerable installation space, which makes it inconvenient for installation and at times even unsafe in use. The large optical aperture of conventional HUDs also pose a significant optical structuring challenge, rendering the HUDs with either a compromising performance, or leading to high cost wherever high-performance is required. The chromatic dispersion of high-quality holographic HUDs is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can readily be installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

Another important application of the present invention is the provision of a large screen of a true three-dimensional (3-D) view. Ongoing developments in information technology have led to an increasing demand for 3-D displays. Indeed, a broad range of 3-D equipment is already on the market. The available systems, however, require users to wear special devices to separate the images intended for left eye and the right eye. Such "aided viewing" systems have been firmly established in many professional applications. Yet further expansion to other fields will require "free viewing" systems with improved viewing comfort and closer adaptation to the mechanisms of binocular vision. Known solutions to this problem suffer from various disadvantages and they fall short of familiar 2-D displays, in terms of image quality and viewing comfort. Using the present invention, however, it is possible to implement a real high-quality 3-D autostereoscopic display that requires no viewing aids and that can readily be fabricated with standard optical manufacturing processes.

A further application of the present invention is a compact display with a wide FOV for mobile, hand-held application such as a cellular phone. In today's wireless internet-access market, sufficient bandwidth is available for full video transmission. The limiting factor remains the quality of the display within the end-user's device. The mobility requirement restricts the physical size of the displays, and the result is a direct-display with a poor image viewing quality. The present invention enables, a physically very compact display with a very large virtual image. This is a key feature in mobile communications, and especially for mobile internet access, solving one of the main limitations for its practical implementation. Thereby the present invention enables the viewing of the digital content of a full format internet page within a small, hand-held device, such as a cellular phone.

The broad object of the present invention is, therefore, to alleviate the drawbacks of prior art compact optical display devices and to provide other optical components and systems having improved performance, according to specific requirements.

Accordingly the invention provides an optical device, comprising a light-transmitting substrate having at least two major surfaces parallel to each other and two edges; optics for coupling light into said substrate by internal reflection, characterized in that at least one of said edges is slanted with respect to said major surfaces and wherein at least a portion of said optics for coupling light into the substrate is in contact with, or located adjacent to, said slanted edge.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

Figure 1:
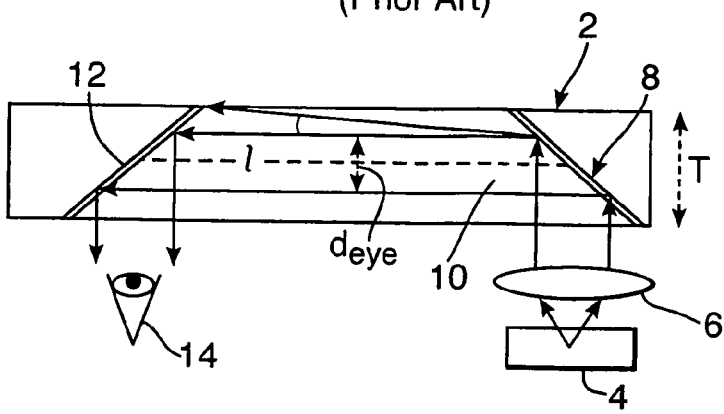
Figure 2:
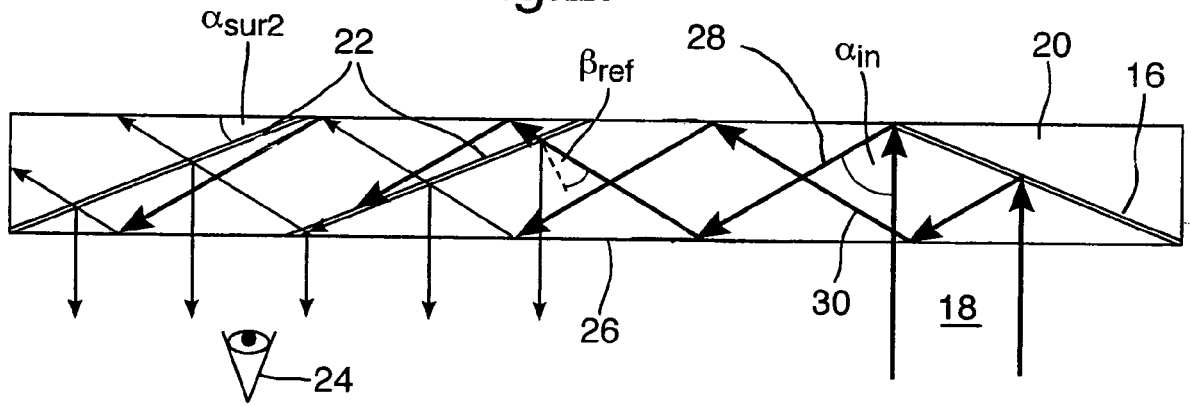
Figure 3A:
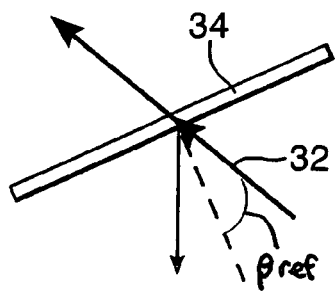
Figure 3B:
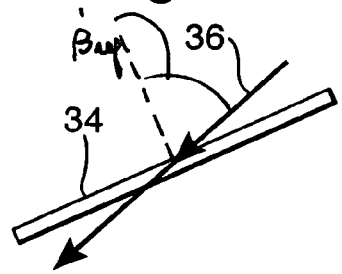
Figure 4:
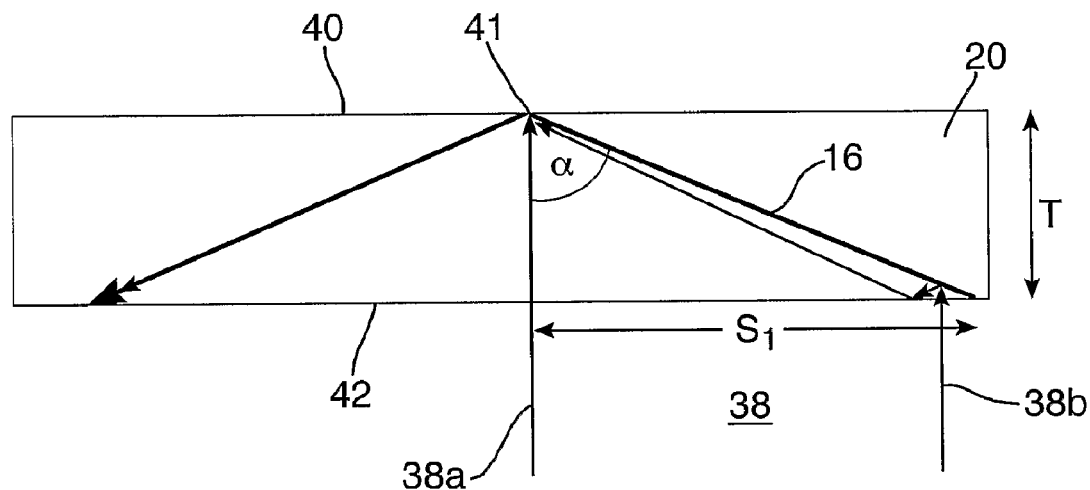
Figure 5:
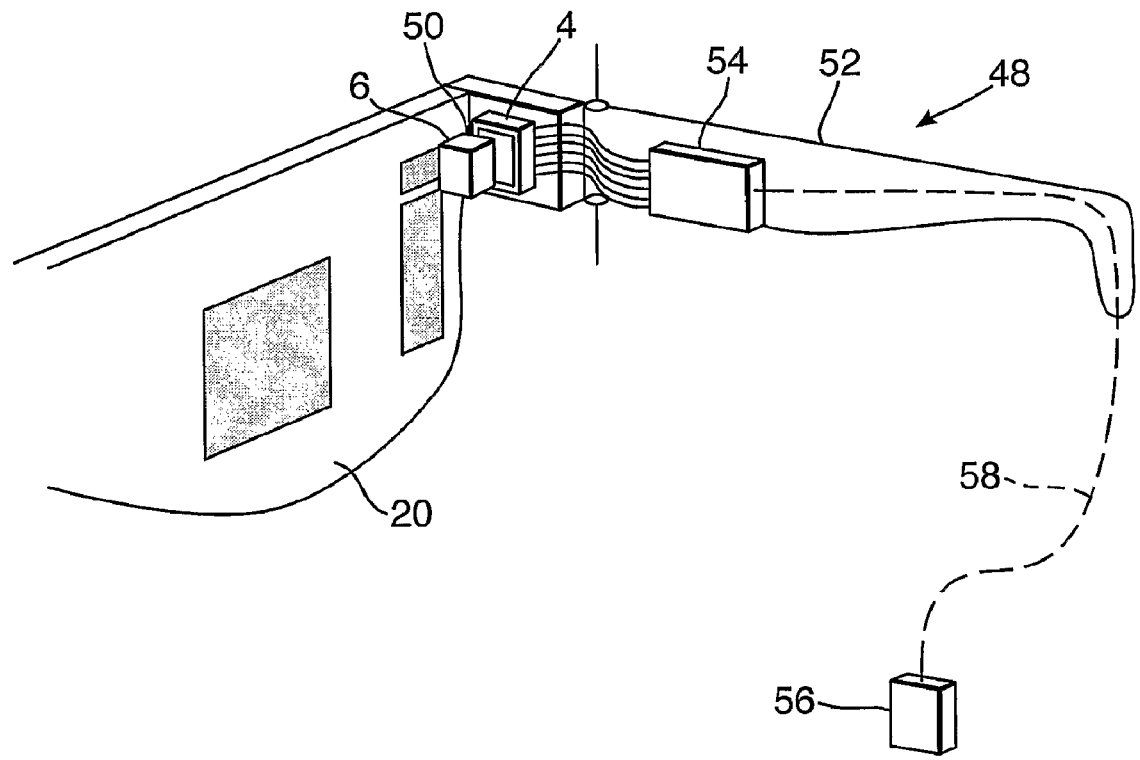
Figure 6:
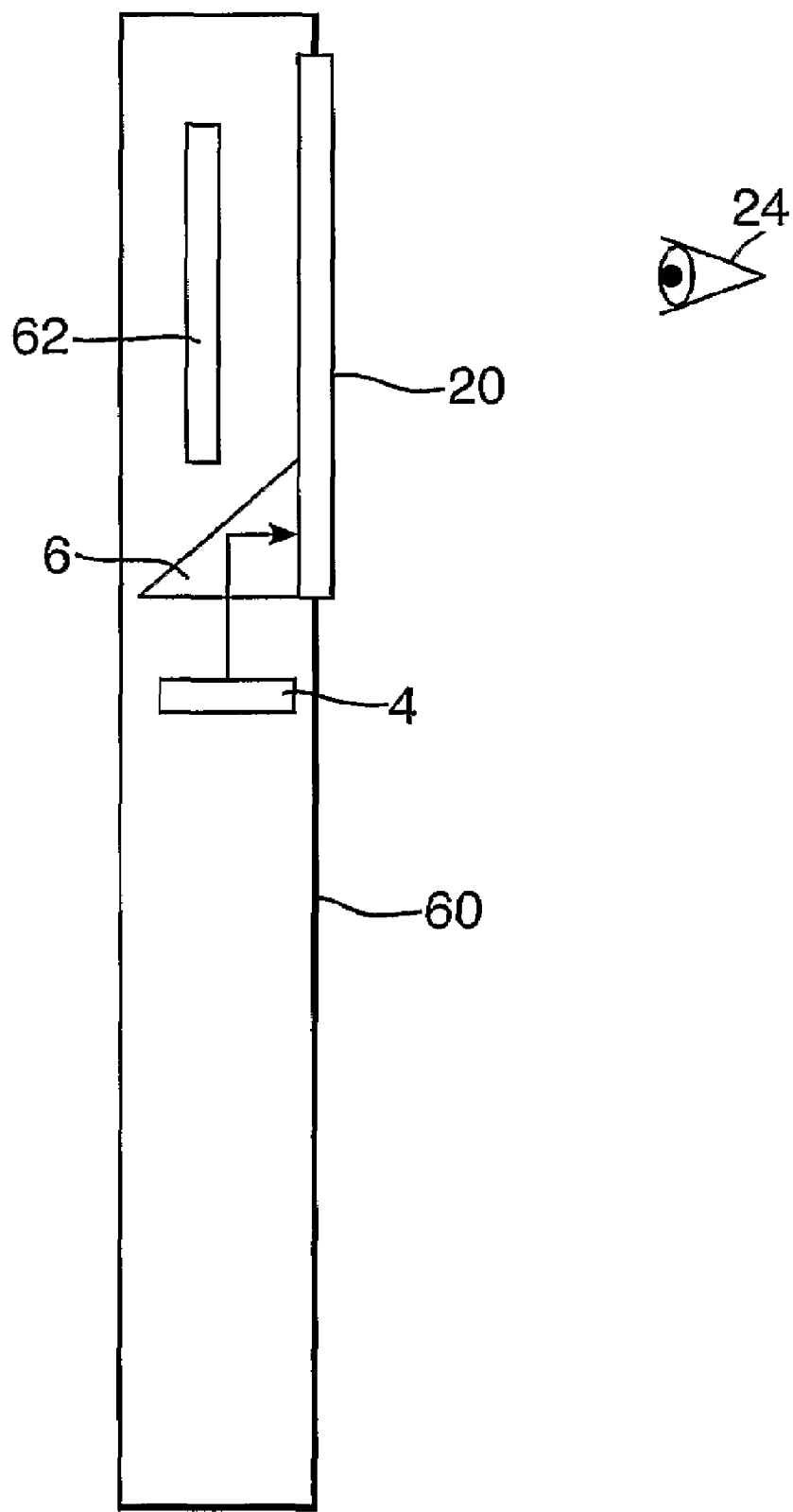
Figure 7:
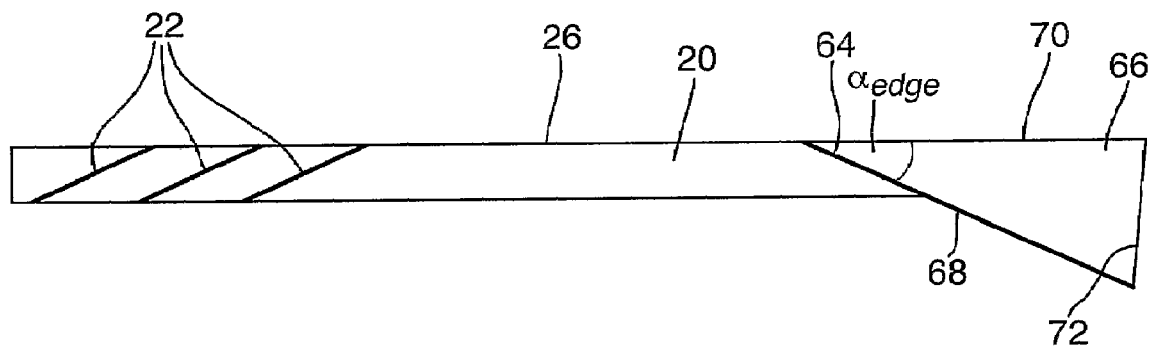
Figure 8:
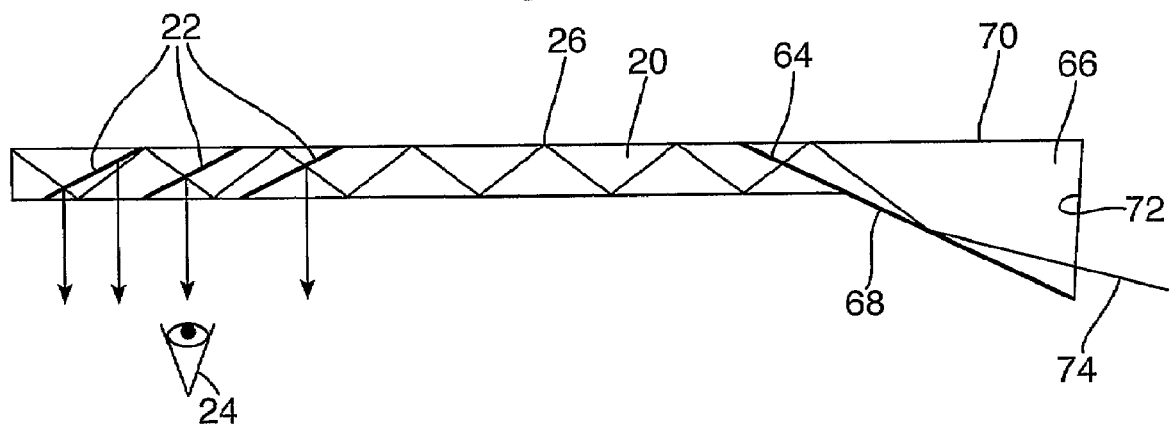
Figure 9:
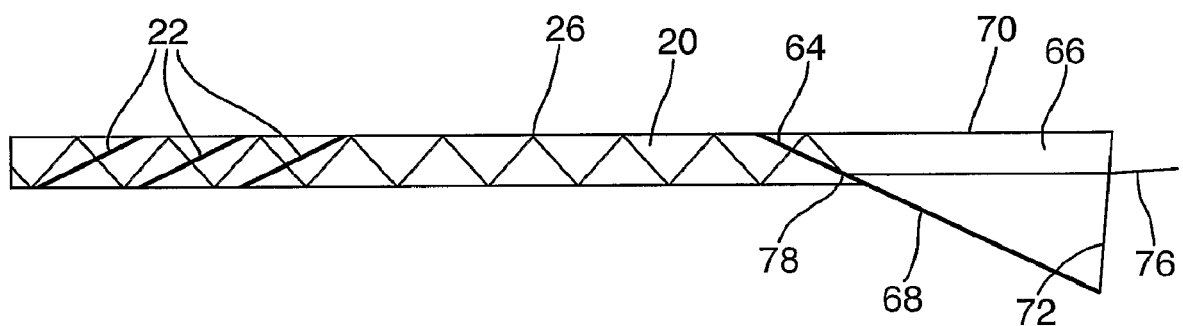
Figure 10A:
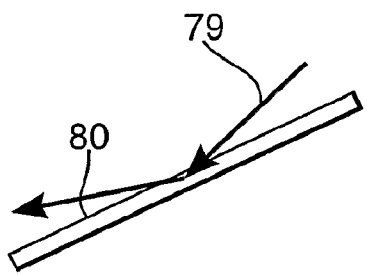
Figure 10B:
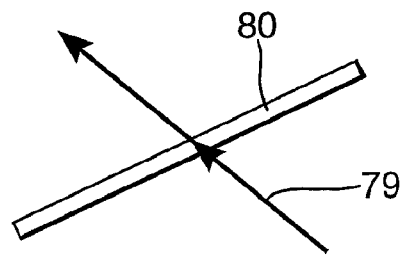
Figure 11:
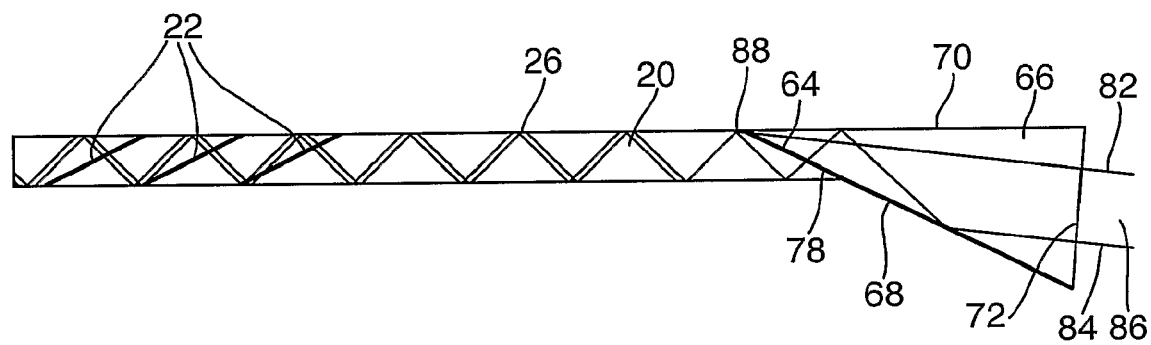
Figure 12:
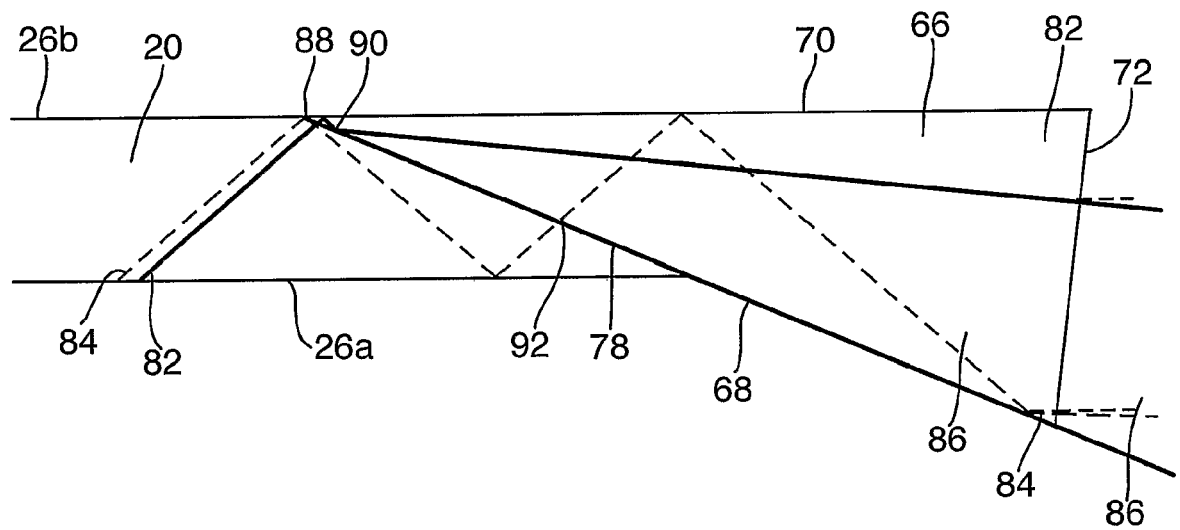
Figure 13:
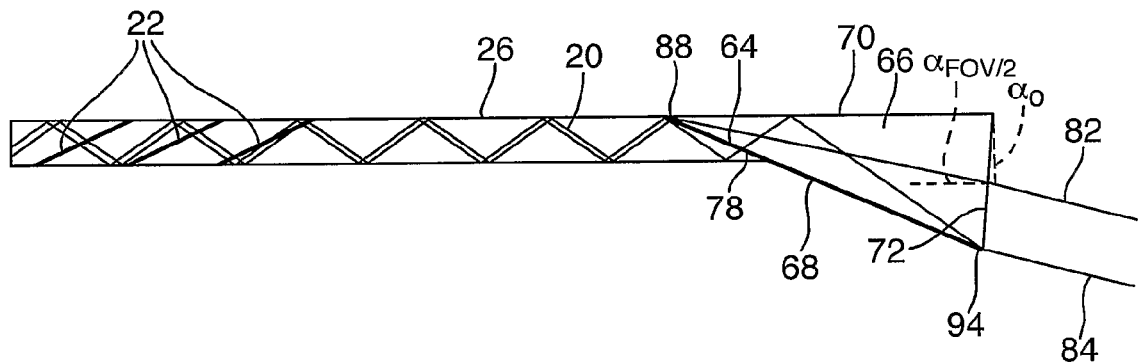
Figure 14:
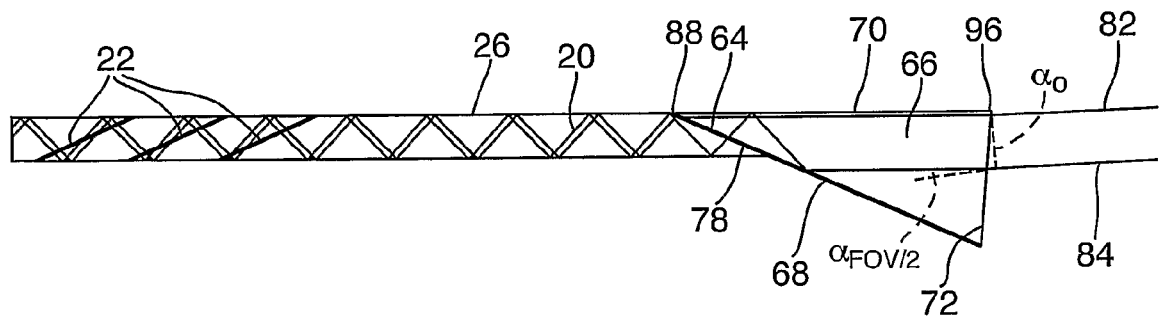
Figure 15:
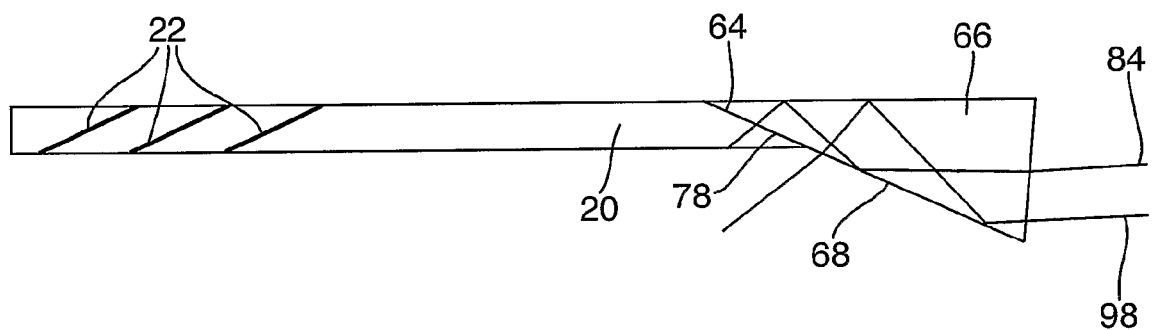
Figure 16:
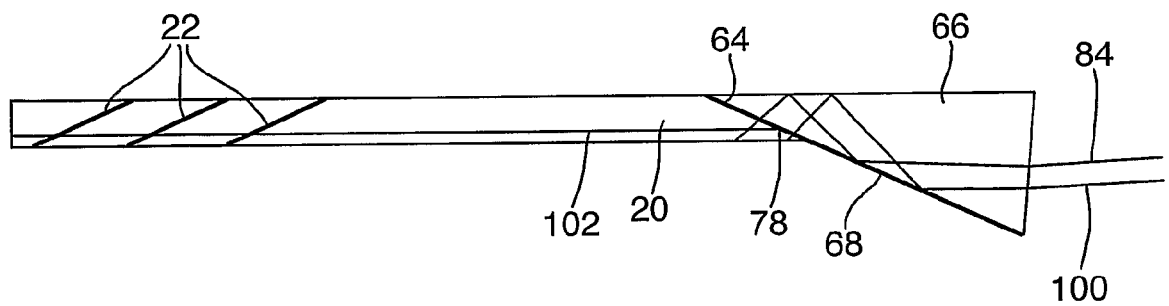
Figure 17:
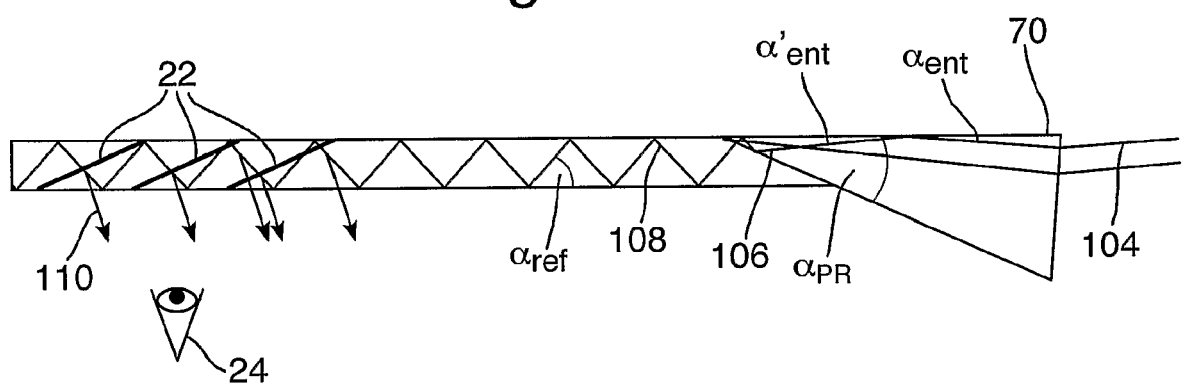
Figure 18:
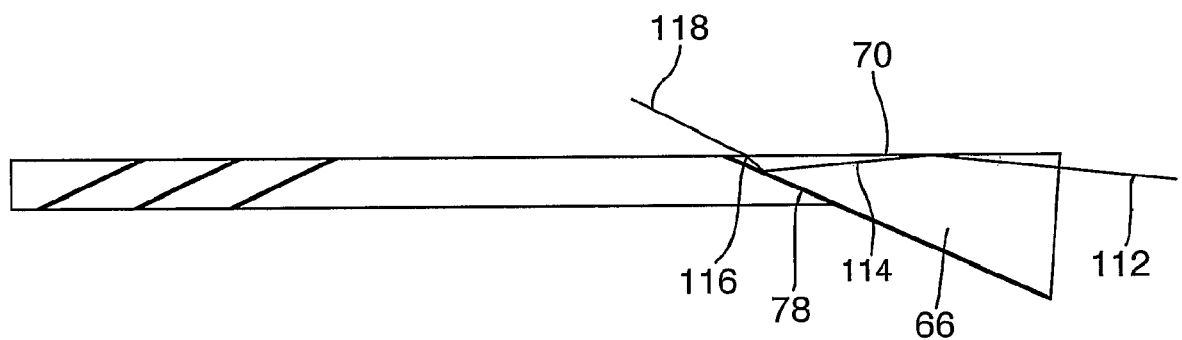
Figure 21:
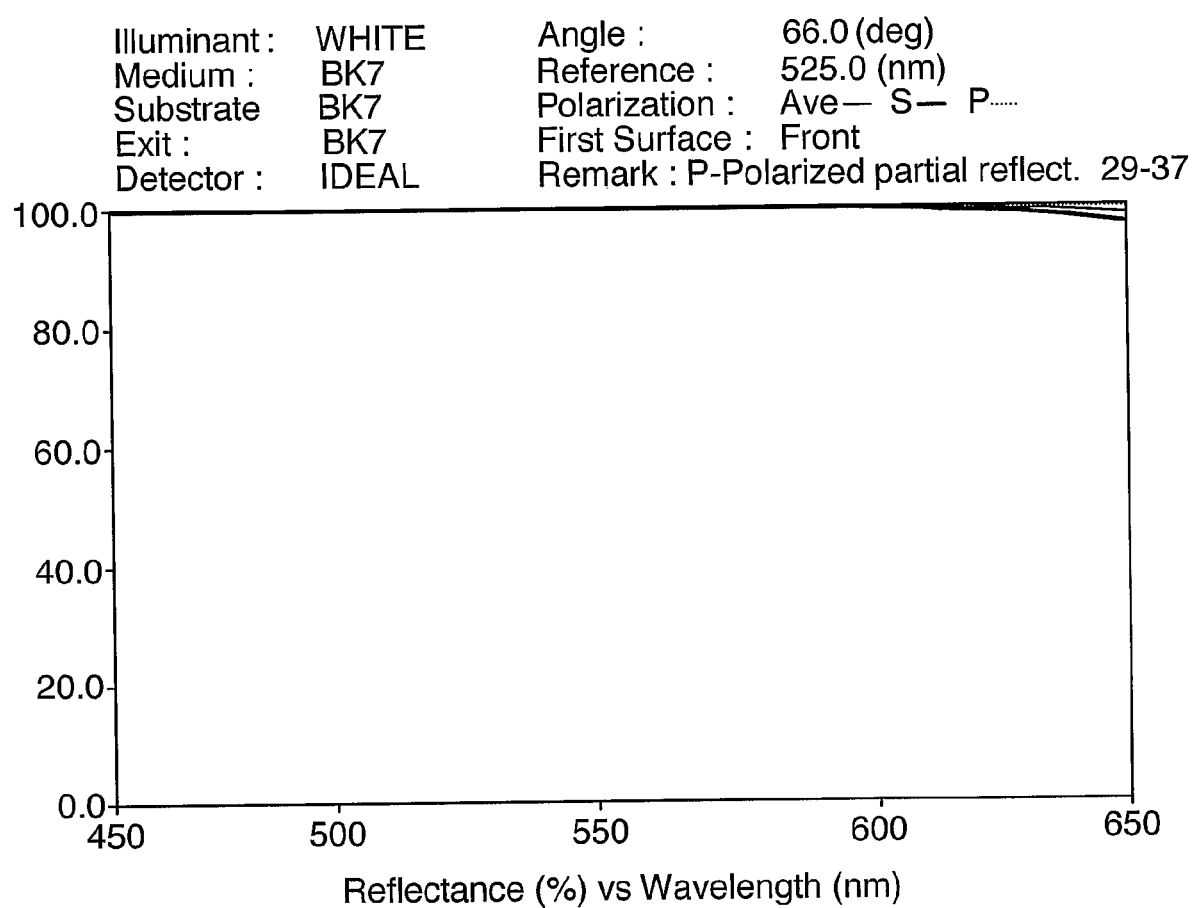
Figure 22:
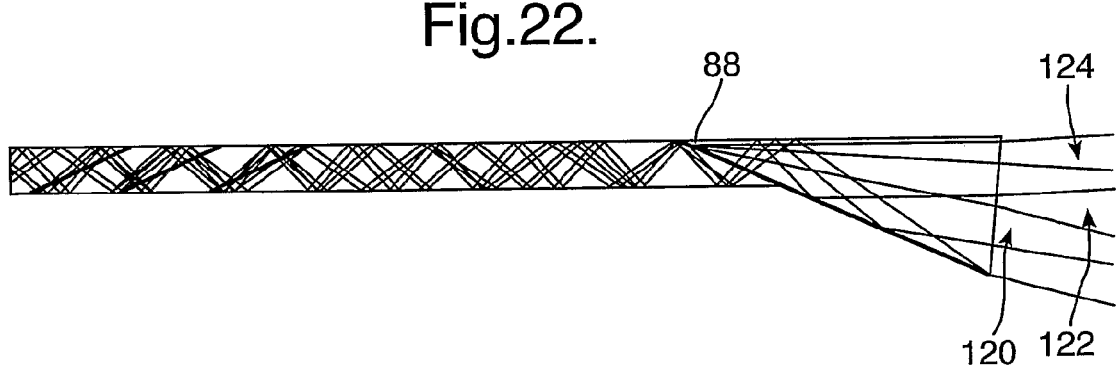
Figure 23:
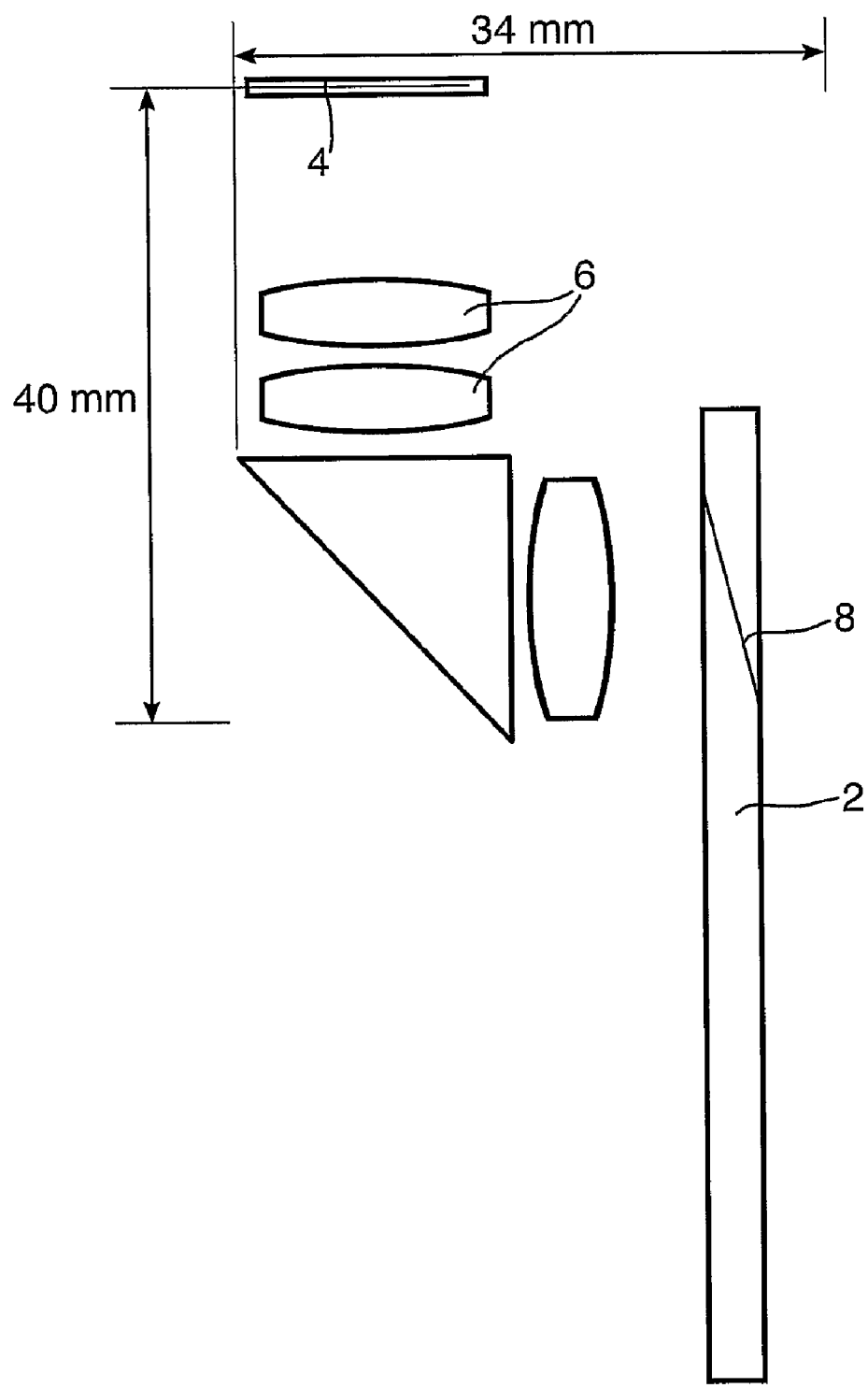
Figure 24:
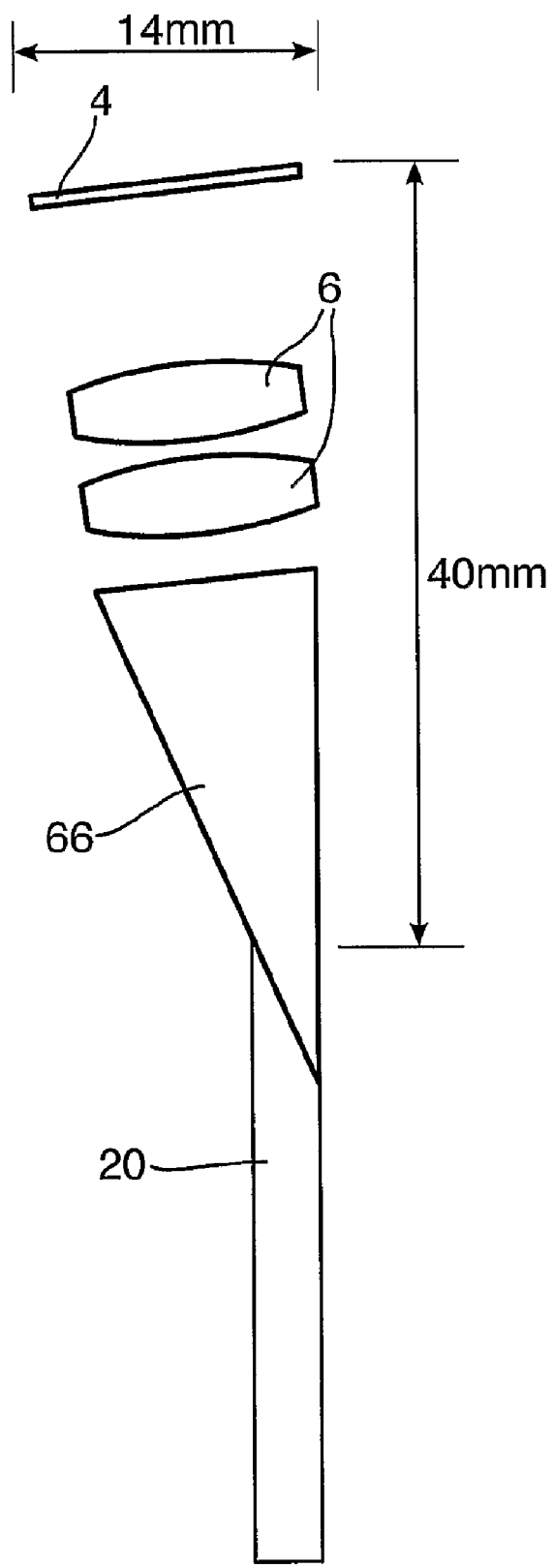
Figure 25:
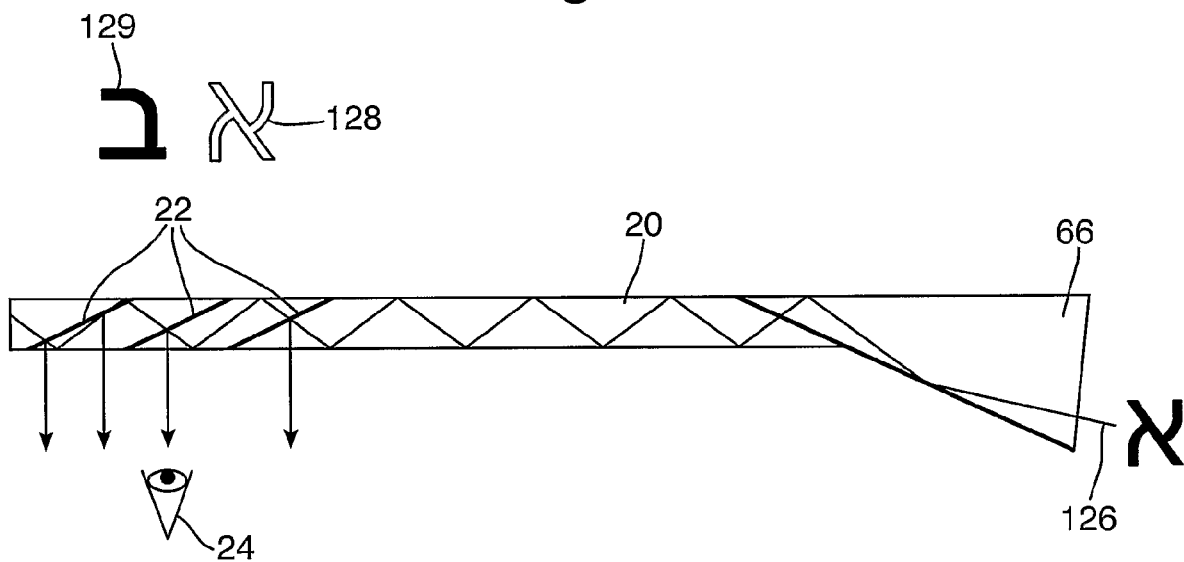
Figure 26:
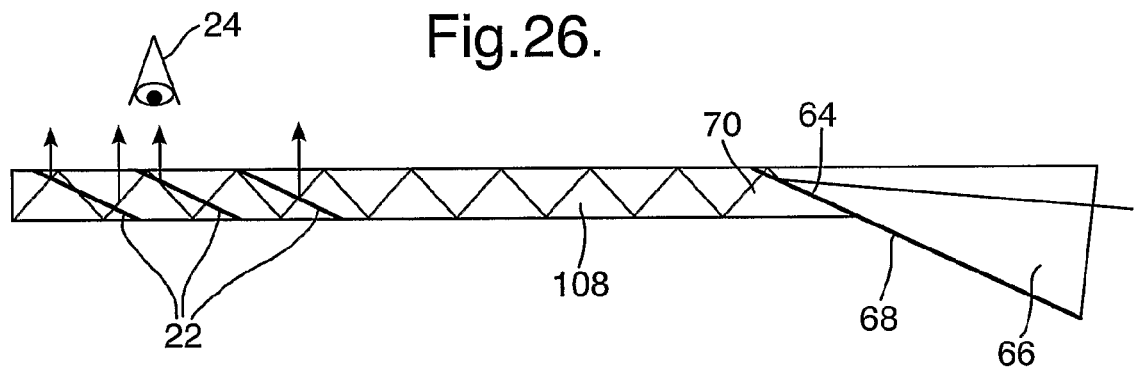
Figure 27:
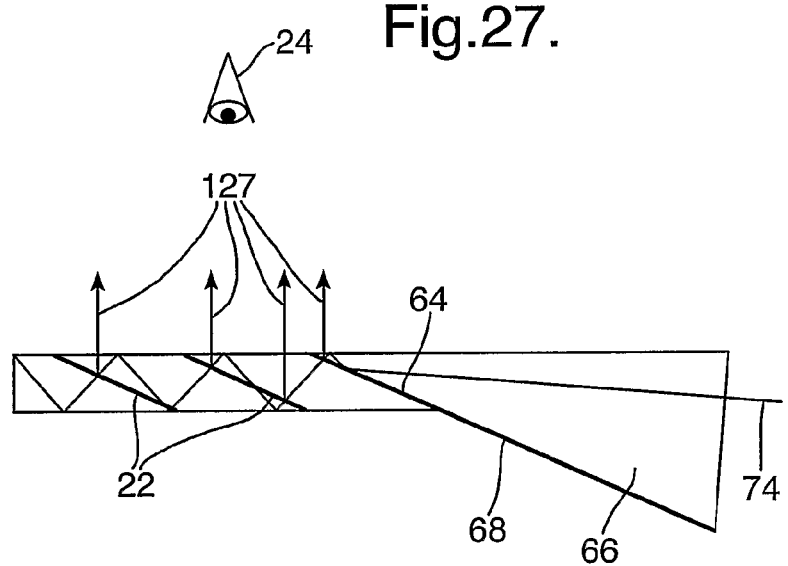
Figure 28:
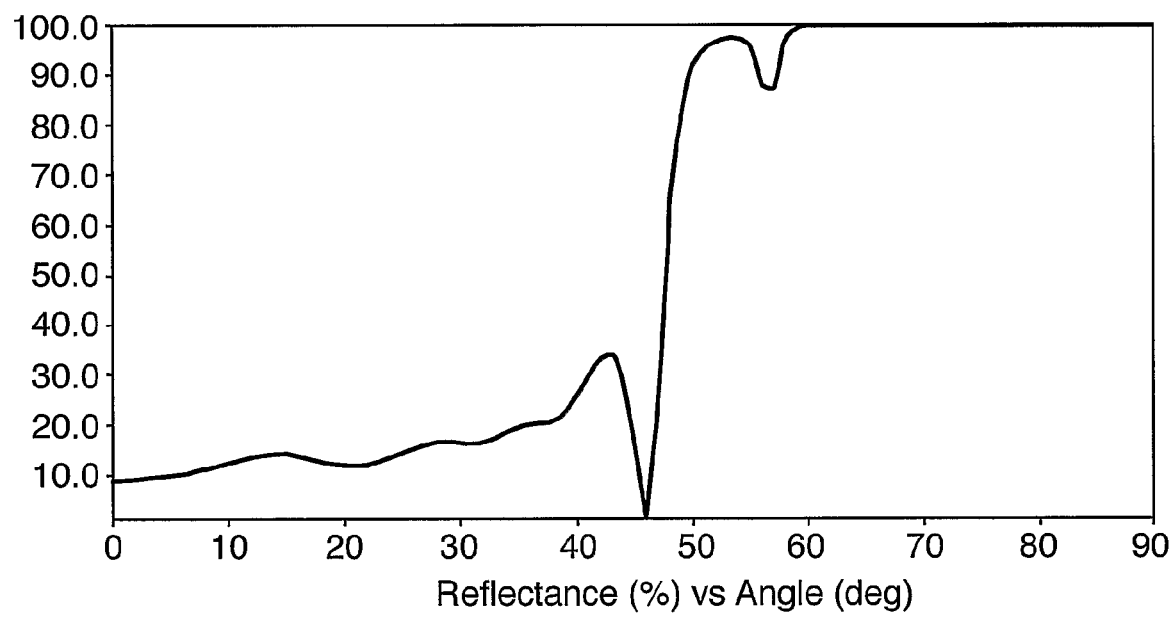
Figure 31:
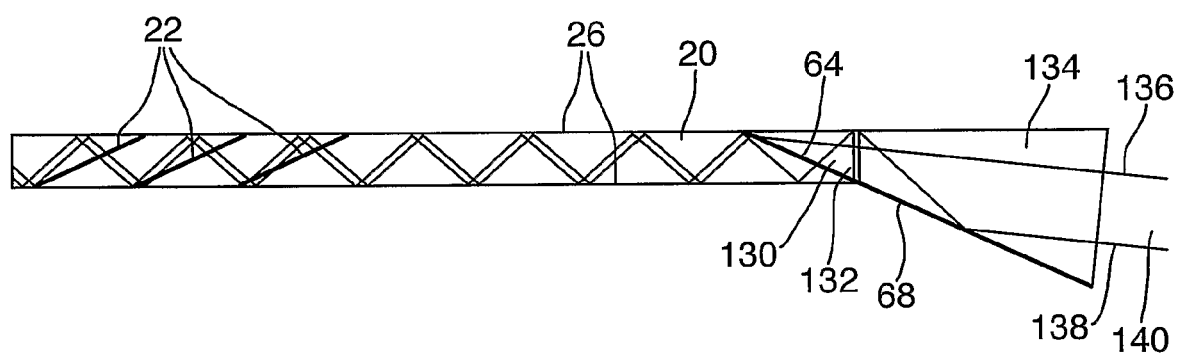
Figure 32:
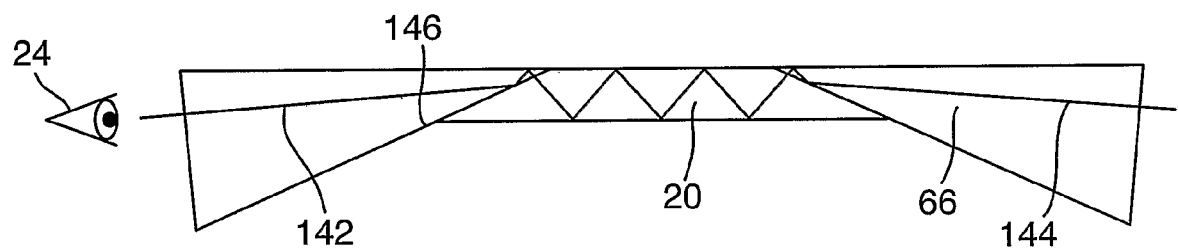

IN THE DRAWINGS:

FIG. 1 is a side view of a generic form of prior art folding optical device;

FIG. 2 is a side view of an exemplary light-guide optical element in accordance with the present invention;

FIGS. 3A and 3B illustrate the desired reflectance and transmittance characteristics of selectively reflecting surfaces for two ranges of incident angles;

FIG. 4 is a schematic sectional-view of a reflective surface embedded inside a light-guide optical element;

FIG. 5 illustrates an exemplary embodiment of a light-guide optical element embedded in a standard eyeglasses frame;

FIG. 6 illustrates an exemplary embodiment of a light-guide optical element embedded in a hand carried display system;

FIG. 7 illustrates an exemplary prism for coupling light into a light-guide optical element system, in accordance with the present invention;

FIG. 8 illustrates an exemplary ray which is coupled into a light-guide optical element system by a coupling-in prism, in accordance with the present invention;

FIG. 9 illustrates another exemplary ray which is coupled into a light-guide optical element system by a coupling-in prism, in accordance with the present invention;

FIGS. 10A and 10B illustrate the desired reflectance and transmittance characteristics of selectively reflecting surfaces used in the present invention, for two ranges of incident angles;

FIG. 11 illustrates two marginal rays of a plane wave which are coupled into a light-guide optical element system by a coupling-in prism, in accordance with the present invention;

FIG. 12 illustrates an enlarged view of two marginal rays of a plane wave which are coupled into a light-guide optical element system by a coupling-in prism, in accordance with the present invention;

FIG. 13 illustrates two marginal rays of another plane wave which are coupled into a light-guide optical element system by a coupling-in prism, in accordance with the present invention;

FIG. 14 illustrates two marginal rays of yet another plane wave which are coupled into a light-guide optical element system by a coupling-in prism, in accordance with the present invention;

FIG. 15 illustrates an exemplary stray ray which is not coupled into a light-guide optical element system and does not reach the eye motion box of the optical system;

FIG. 16 illustrates another stray ray which is coupled into a light-guide optical element system by a coupling-in prism but does not reach the eye motion box of the optical system;

FIG. 17 illustrates yet another stray ray which is coupled into a light-guide optical element system by a coupling-in prism and reaches the eye motion box of the optical system to create a ghost image;

FIG. 18 illustrates yet another stray ray which is not coupled into a light-guide optical element system and does not reach the eye motion box of the optical system;

FIG. 19 illustrates the reflectance curves as a function of incident angle for an exemplary dichroic coating;

FIG. 20 illustrates the reflectance curves as a function of wavelength for an exemplary dichroic coating for an incident angle of 34°;

FIG. 21 illustrates the reflectance curves as a function of wavelength for an exemplary dichroic coating for an incident angle of 66°;

FIG. 22 illustrates two marginal rays of three different plane waves which are trapped into a light-guide optical element system by a coupling-in prism, in accordance with the present invention;

FIG. 23 illustrates an exemplary optical system wherein the image is coupled into a light-guide element using a frontal coupling-in element;

FIG. 24 illustrates an exemplary optical system wherein the image is coupled into a light-guide element using a coupling-in prism, in accordance with the present invention;

FIG. 25 is a diagram illustrating a method of combining two aspects of the external scene onto the eye of the viewer, using a device in accordance with the present invention;

FIG. 26 illustrates another configuration for coupling light into a light-guide optical element system, in accordance with the present invention;

FIG. 27 illustrates yet another configuration having compact dimensions for coupling light into a light-guide optical element system, in accordance with the present invention;

FIG. 28 illustrates the reflectance curves as a function of incident angle for another exemplary dichroic coating;

FIG. 29 illustrates the reflectance curves as a function of wavelength for an exemplary dichroic coating for another incident angle of 34°;

FIG. 30 illustrates the reflectance curves as a function of wavelength for an exemplary dichroic coating for another incident angle of 66°;

FIG. 31 illustrates an alternative assembly for a light-guide optical element system, in accordance with the present invention, and FIG. 32 illustrates yet another configuration for coupling light out of a light-guide optical element system, in accordance with the present invention.

DETAILED DESCRIPTION OF PREFERRED EMBODIMENTS

FIG. 1 illustrates a conventional, prior art, folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye 14 of a viewer. Despite the compactness of this configuration, it suffers significant drawbacks; in particular, only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein T is the substrate thickness;
$d_{eye}$ is the desired exit-pupil diameter, and
l is the distance between reflecting surfaces 8 and 12.

With angles higher than $\alpha_{max}$ the rays are reflected from the substrate surface before arriving at the reflecting surface 12. Hence, the reflecting surface 12 will be illuminated at an undesired direction and ghost images appear.

Therefore, the maximum achievable FOV with this configuration is:

$$FOV_{max} \approx 2\nu\alpha_{max}, \quad (2)$$

wherein $\nu$ is the refractive index of the substrate.

Typically the refractive index values lie in the range of 1.5-1.6.

Commonly, the diameter of the eye pupil is 2 to 6 mm. To accommodate movement or misalignment of the display, a larger exit-pupil diameter is necessary. Taking the minimum desirable value at approximately 8 to 10 mm, the distance between the optical axis of the eye and the side of the head, l, is, typically, between 40 and 80 mm. Consequently, even for a small FOV of 8°, the desired substrate thickness would be of the order of 12 mm.

Methods have been proposed to overcome the above problem. These include, utilizing a magnifying telescope inside the substrate and non-parallel coupling directions. Even with these solutions, however, and even if only one reflecting surface is considered, the system thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T \tan\alpha_{sur} - d_{eye}}{R_{eye}}, \quad (3)$$

wherein $\alpha_{sur}$ is the angle between the reflecting surface and the normal to the substrate plane, and
$R_{eye}$ is the distance between the eye of the viewer and the substrate (typically, about 30-40 mm).

Practically $\tan\alpha_{sur}$ cannot be much larger than 1; hence, for the same parameters described above for a FOV of 8°, the required substrate thickness here is on the order of 7 mm, which is an improvement on the previous limit. Nevertheless, as the desired FOV increases, the substrate thickness increases rapidly. For instance, for a desired FOV of 15° and 30°, the substrate limiting thickness is 18 mm or 25 mm, respectively.

To alleviate the above limitations, it is possible to utilize an array of selectively reflecting surfaces, fabricated within an LOE. FIG. 2 illustrates a sectional view of an LOE. The first reflecting surface 16 is illuminated by a collimated display 18 emanating from a light source (not shown) located behind the device. The reflecting surface 16 reflects the incident light from the source such that the light is trapped inside a planar substrate 20 by total internal reflection. After several reflections from the surfaces of the substrate, the trapped waves reach an array of one or more selectively reflecting surfaces 22, which couples the light out of the substrate into the eye 24 of a viewer, wherein surfaces 22 are usually parallel to each other. Assuming that the central wave of the source is coupled out of the substrate 20 in a direction normal to the substrate surface 26, and the off-axis angle of the coupled wave inside the substrate 20 is $\alpha_{in}$, then the angle $\alpha_{sur2}$ between the reflecting surfaces and the substrate plane is:

$$\alpha_{sur2} = \frac{\alpha_{in}}{2}. \quad (4)$$

As can be seen in FIG. 2, the trapped rays arrive at the selectively reflecting surfaces 22 from two distinct directions 28, 30. In this particular embodiment, the trapped rays arrive at the selectively reflecting surface 22 from one of these directions 28 after an odd number of reflections from the substrate surfaces 26, wherein the incident angle $\beta_{ref}$ between the trapped ray and the normal to the reflecting surface is:

$$\beta_{ref} = \alpha_{in} - \alpha_{sur2} = \frac{\alpha_{in}}{2}. \quad (5)$$

The trapped rays arrive at the selectively reflecting surface 22 from the second direction 30 after an even number of reflections from the substrate surfaces 26, where the off-axis angle is $\alpha'_{in} = 180° - \alpha_{in}$ and the incident angle between the trapped ray and the normal to the reflecting surface is:

$$\beta'_{ref} = \alpha'_{in} - \alpha_{sur2} = 180° - \alpha_{in} - \alpha_{sur2} = 180° - \frac{3\alpha_{in}}{2}. \quad (6)$$

In order to prevent undesired reflections and ghost images, it is important that the reflectance be negligible for one of these two directions. The desired discrimination between the two incident directions can be achieved if one angle is significantly smaller than the other one. Fortunately, it is possible to design a coating with very low reflectance at high incident angles and a high reflectance for low incident angles. This property can be exploited to prevent undesired reflections and ghost images by eliminating the reflectance in one of the two directions. For example, choosing $\beta_{ref} \sim 25°$ from Equations (5) and (6) it can be calculated that:

$$\beta'_{ref} = 105°; \alpha_{in} = 50°; \alpha'_{in} = 130°; \alpha_{sur2} = 25°. \quad (7)$$

If now a reflecting surface is determined for which $\beta'_{ref}$ is not reflected but $\beta_{ref}$ is, the desired condition is achieved. FIGS. 3A and 3B illustrate the desired reflectance behavior of selectively reflecting surfaces. While the ray 32 (FIG. 3A), having an off-axis angle of $\beta_{ref} \sim 25°$, is partially reflected and coupled out of the substrate 34, the ray 36 (FIG. 3B), which arrives at an off-axis angle of $\beta'_{ref}\sim75°$ to the reflecting surface (which is equivalent to $\beta'_{ref}\sim105°$), is transmitted through the reflecting surface 34 without any notable reflection.

Hence, as long as it can be ensured that $\beta'_{ref}$, where very low reflections are desired, will have negligible reflection, similar to that at $\beta'_{ref}\sim75°$, over its angular spectrum, while $\beta_{ref}$, will have higher reflections, over its angular spectrum, for a given FOV, one can ensure the reflection of only one substrate mode into the eye of the viewer and a ghost-free image.

It is important, however, not only to couple the image out of the substrate without any distortion or ghost image but also to couple the light properly into the substrate. FIG. 4, which illustrates one method for coupling-in, presents a sectional view of the reflective surface 16, which is embedded inside the substrate 20 and couples light 38 from a display source (not shown) and traps it inside the substrate 20 by total internal reflection. To avoid an image with gaps or stripes, it is essential that the trapped light cover the entire area of the LOE major surfaces. To ensure this, the points on the boundary line 41 between the edge of the reflective surface 16 and the upper surface 40 of the substrate 20 should be illuminated for a single wave by two different rays that enter the substrate from two different locations: a ray 38a that illuminates the boundary line 41 directly, and another ray 38b, which is first reflected by the reflecting surface 16 and then by the lower surface 42 of the substrate, before illuminating the boundary line.

The embodiment described above with regard to FIG. 4 is an example of a method for coupling input waves into the substrate. Input waves could, however, also be coupled into the substrate by other optical means, including, but not limited to, folding prisms, fiber optic bundles, diffraction gratings, and other solutions. Furthermore, in the example illustrated in FIG. 2, the input waves and the image waves are located on the same side of the substrate. Other configurations are envisioned in which the input and the image waves could be located on opposite sides of the substrate.

FIG. 5 illustrates an embodiment that utilizes the coupling-in method described in FIG. 4, in which the LOE 20 is embedded in eyeglasses frame 48. The display source 4, the collimating lens 6, and the folding lens 50 are assembled inside the arm portions 52 of the eyeglasses frame, next to the edge of the LOE 20. In a case in which the display source is an electronic element, such as a small CRT, LCD or OLED, the driving electronics 52, 54 for the display source might be assembled inside the back portion of the arm 52. A power supply and data interface 56 can be connected to arm 52 by a lead 58 or other communication means, including radio or optical transmission. Alternatively, a battery and miniature data link electronics can be integrated into the eyeglasses frame.

FIG. 6 illustrates another application that utilizes the coupling-in method described in FIG. 4. This application is a hand-held display (HHD) which resolves the previously opposing requirements, of achieving small mobile devices, and the desire to view digital content on a full format display, by projecting high quality images directly into the eye of the user. An optical module including the display source 4, the folding and collimating optics 6 and the substrate 20 is integrated into the body of a cellular phone 60, where the substrate 20 replaces the existing protective cover-window of the phone. Specifically, the volume of the support components, including source 4 and optics 6 is sufficiently small to fit inside the acceptable volume for modern cellular devices. In order to view the full screen, transmitted by the device, the user positions the window in front of his eye 24, observing the image with high FOV, a large eye-motion-box and a comfortable eye-relief. It is also possible to view the entire FOV at a larger eye-relief by tilting the device to display different portions of the image. Furthermore, since the optical module can operate in see-through configuration, a dual operation of the device is possible; namely there is an option to maintain the conventional cellular display 62 intact. In this manner, the standard, low-resolution display can be viewed through the LOE 20 when the display source 4 is shut-off. In a second, virtual-mode, designated for e-mail reading, internet surfing, or video operation, the conventional display 62 is shut-off, while the display source 6 projects the required wide FOV image into the eye of the viewer through the LOE 20. The embodiment described in FIG. 6 is only an example, illustrating that applications other than head-mounted displays can be materialized. Other possible hand-carried arrangements include palm computers, small displays embedded into wristwatches, a pocket-carried display having the size and weight reminiscent of a credit card, and many more.

In the applications illustrated above, the input waves are coupled into the substrate through one of its major surfaces. This method is disadvantageous where it is required that the overall system be very thin. As illustrated in FIG. 6, the folding and collimating optics 6 is located next to one of the major surface of the LOE. Since the volume of the optical element 6 is determined by the field-of view (FOV), the thickness of the element can be more than 15 mm for a moderate FOV of 24°. Hence, the minimum thickness of the entire optical system can be more than 20 mm. This is a severe drawback for compact applications like cellular phones, where it is sometimes required that the overall thickness of the system be less than 15 mm. In such a case, the thickness of the optical module could not exceed 12 mm. Therefore, in order to overcome this drawback, it is necessary, for certain applications, to couple the input waves into the substrate through one of the peripheral sides of the substrate.

FIG. 7 illustrates a method and a structure for coupling light into the substrate through one of its edges. Here, the light-transmitting substrate 20 has two major parallel surfaces 26 and edges, wherein at least one edge 64 is oriented at an oblique angle with respect to the major surfaces 26 and wherein $\alpha_{edge}$ is the angle between the edge 64 and the normal to the substrate major surfaces. Besides the substrate 30, the optical module comprises optics for coupling light into said substrate by internal reflection. This optics 66 can be embodied by, e.g., a prism wherein one of its surfaces 68 is located next to the slanted edge 64 of the substrate. The prism also comprises two additional polished surfaces, 70 and 72.

FIG. 8 illustrates how a light ray can be coupled into the substrate 20 by utilizing the optics 66. An optical ray 74 enters the optics 66 through the surface 72, is reflected by internal reflection off surface 68, reflected again off surface 70 and then enters the substrate 20 through the edge 64. The ray 74 is then trapped inside the substrate by internal reflection. It is then coupled out of the substrate by reflection off the reflecting surfaces 22.

As illustrated in FIG. 8, the ray 74 is reflected from surface 68 by internal reflection, caused by the glass-air interface. In FIG. 9, there is shown an embodiment where the input ray 76 enters the optics 66 from a different location or at a different angle, whereby the ray 76 is first reflected at the interface 78 between surface 68 and the edge 64. The ray 76 impinges on the interface 78 twice: when it is reflected towards surface 70 and then when it passes through the interface 78 and enters the substrate 20. Hence, it is important that the interface 78 will have a reflecting mechanism with a high reflectance for the first impingement of light rays and a negligible reflectance for the second one. The desired discrimination between the two incident directions can be achieved if one angle is smaller than the other one. Usually, the first impinging angle is very large and the second one is small.

There are two principal methods for achieving the required discrimination between the two incident directions. One method is to cement the two adjacent surfaces 64 and 68 together using index-matching cement, wherein the upper surface 26b of the substrate is co-aligned with surface 70 of the prism. The surface 64, or alternatively, the part of surface 68 which makes contact with surface 64 should, in this case, be coated with an angular sensitive coating.

FIGS. 10A and 10B illustrate the desired reflectance behavior of selectively reflecting coating 80. In the first impingement of light rays, at a high incident angle (FIG. 10A), the rays 79 are totally reflected from the coating 80, whereas at the second impingement (FIG. 10B), the rays 79, arriving at a small incident angle, are transmitted through the reflecting coating 80 without any notable reflection. An alternative method of achieving the required discrimination between the two incident directions, is to use an air gap between the surfaces 64 and 68. In such a case, the rays 79 will be reflected at the first impingement from the surface 68 by total internal reflection caused by the glass-air interface, and in the second impingement, most of the light rays will pass through the surfaces 68 and 64 and only small part of the energy will be reflected back by Fresnel reflection. These undesired reflections may be avoided by using simple anti-reflectance coatings on surfaces 64 and 68. It should be noted that although it is usually preferred, the surfaces 64 and 68 should not necessarily be parallel. A small offset angle may be set between the two surfaces according to the requirements of an exact design of the optical setup. In order to avoid gaps and stripes in the final image, it is required that the two surfaces will be located close to each other, at least at the contact point between surfaces 26 and 70. Naturally, the first method is preferable for the achievement of optimal performance and a more stabilized mechanical setup. For low-end applications, in which low price of the product and simplicity of fabrication and assembly processes are critical issues, the air-gap method may be preferred.

FIGS. 8 and 9 illustrate examples of single rays that are coupled into the substrate 20 by the coupling-in optics 66. In order to achieve an optimal image, it is important to verify that all of the rays over the entire FOV are properly coupled into the substrate, with no gaps, stripes, distortion or ghost images.

FIG. 11 illustrates two marginal rays, 82 and 84, of the same plane wave 86, coupled into the substrate. In order to avoid an image with gaps or stripes, it is essential that the trapped rays from each plane wave cover the entire area of the LOE main surfaces. To ensure this, the points on the boundary line 88 that connect the surfaces 26, 64, 68 and 70, should be illuminated for a single wave by two different rays that enter the substrate in two different locations. In addition, the boundary line 88 should as thin as possible, hence surface 70 of the prism 66 and the major surface 26 of the substrate should be attached together at their apexes.

FIG. 12 illustrates an enlarged view of the region of the boundary line 88. One of the marginal rays 82 impinges on surface 68 next to the boundary line, where it is reflected off surface 68 and then reflected off surface 70. The ray then meets surface 68 again, where it enters the substrate at the point 90 before the boundary line 88. The second marginal ray 84, depicted by the broken line, is reflected from surface 68 close to the entry surface 72. It is then reflected off surface 70 and then enters the substrate 20 at the point 92. This ray 84 is then reflected inside the substrate 20 from the lower surface 26a and then impinges on the upper surface 26b just after the boundary line 88. As seen, subsequent to this reflection from surface 26b, the two marginal rays are adjacent to each other, i.e., a substantially single point on the boundary line 88 is illuminated by two different rays 82 and 84 from a single illuminating wave 86. Since all of the other rays of the plane wave 86, which are located between the marginal rays at the entrance surface 72, are coupled into the substrate, it is ensured that the trapped rays from the plane wave 86 cover the entire area of the LOE, hence, an image with gaps or stripes is avoided.

Naturally, it is required that the two marginal rays be adjacent to each other inside the LOE not only for a single plane wave but for every plane wave over the entire FOV. It is usually sufficient to check this condition for the two plane waves at the edges of the FOV. To prevent chromatic dispersion, it is assumed that the central wave of the FOV enters the optics 66 normal to the surface 72. Hence, the incident angles of the two extreme waves inside the prism, compared to the major plane of the LOE, are $\alpha_o-\alpha_{FOV}/2$ and $\alpha_o+\alpha_{FOV}/2$, where $\alpha_{FOV}$ is the field of view of the optical system inside the substrate material and $\alpha_o$ is the angle between surface 72 and the normal to major surfaces of the LOE. FIG. 13 illustrates the geometry of the lower extreme wave having an incident angle of $\alpha_o+\alpha_{FOV}/2$. As illustrated, the lower marginal ray 84 enters the optics 66 at the edge 94 of the surface 72. Hence, in a case of a slightly larger FOV or a slightly smaller entrance aperture, the marginal ray 84 will not illuminate the boundary line 88 and a gap will be formed in the image. Therefore, it should be ensured that for a given FOV the clear aperture of surface 72 is large enough to accommodate the entire plane wave.

FIG. 14 illustrates the geometry of the upper extreme wave 82 having an incident angle of $\alpha_o-\alpha_{FOV}/2$. As illustrated, the upper marginal ray 82 enters the optics 66 at the edge 96 of the surface 72. Here, the issue is not the size of the input aperture but the angle between the upper surface 70 of the optics 66 and the ray 82. For the system illustrated in FIG. 14 where surface 70 is co-aligned with surface 26b, the extreme angle $\alpha_o-\alpha_{FOV}/2$ cannot be smaller than zero, otherwise ray 82 will not illuminate the boundary line 88 and a gap will be formed in the image. Therefore, it should be ensured that, for a given FOV, the off-axis angle of surface 72 will fulfill the condition $\alpha_o>\alpha_{FOV}/2$. Alternatively, it is possible to rotate surface 72, with respect to surface 64, at an angle $\alpha_R$, provided that the condition, $\alpha_o>\alpha_{FOV}/2-\alpha_R$, is fulfilled.

Another issue that must be taken into account is that of the stray rays and ghost images, that is, ensuring that all of the required rays are trapped inside the substrate is not sufficient. The prevention of unwanted rays being coupled into the LOE and out onto the eye of the viewer must also be guaranteed. Usually, by suitably insulating the display source 4, it is possible to block all of the rays emerging from outside of the designated FOV. However, it is usually impossible to prevent rays from outside of the required aperture, namely, rays higher than ray 82 or lower than ray 84, to enter the optical system through surface 72. Therefore, it is important to check all the possible cases and to verify that these rays will not reach the eye of the viewer.

FIG. 15 illustrates the behavior of one such case. Here, a ray 98 having an incident angle of $\alpha_o-\alpha_{FOV}/2$ is located below the lower marginal ray 84. As illustrated, the ray 98 is reflected off surface 68, reflected again off surface 70 and then it impinges on surface 68 outside of the common interface area 78 with surface 64, the substrate edge. Therefore, the ray is coupled out of the optics 66. It can subsequently be blocked from reentering the optical system.

FIG. 16 illustrates another embodiment, wherein the ray 100 is located between the lower marginal ray 84 and ray 98. Here, the ray 100 impinges on surface 68, at the second time, within the common interface 78, and hence enters the substrate 20. However, the ray impinges again on surface 64 from its under-side and is therefore reflected into an undesired direction 102 and coupled into the LOE. This ray impinges on the partially reflecting surfaces 22 at oblique angles inside the angular region where the reflectance of these surfaces is low. Thus, only a negligible part of the energy of this undesired trapped ray will be coupled out. Moreover, the coupled out energy will not arrive at the EMB of the optical system.

FIG. 17 illustrates the behavior of the rays in still another embodiment. Here, a ray 104 at incident angle (with respect to the main surfaces of the substrate 20) $\alpha_{ent}'$ is located above the lower marginal ray 82. Unlike the above embodiments, the ray 104 is first reflected from surface 70 before impinging on surface 68.

Consequently, the reflected ray 106 impinges on surface 68 at an incident angle $$\alpha'_{ent} = 2\alpha_R - \alpha_{ent}, \quad (8)$$

as opposed to the incident angle $\alpha_{ent}$. Since the two angles are close to each other, the ray 106 will be trapped inside the LOE and transmitted at an undesired direction 108 and a ghost image 110 will be coupled out by the reflecting surfaces 22 into the eye 24 of the viewer. In order to avoid this undesirable phenomenon, the reflected ray 106 should be prevented from being coupled into the LOE. Assuming that the angle between surface 68 and surfaces 22 is $\alpha_{PR}$, the direction of a ray that is first reflected off surface 68, and then off surface 70 is given by the equation, $$\alpha_{ref} = 2\cdot(\alpha_{PR} - \alpha_R) - \alpha_{ent}. \quad (9)$$

Hence, the off-axis angle, $\alpha_{in}$, of the coupled wave inside the substrate 20 is:

$$\alpha_{in} = 90° - \alpha_{ref} = 90° - 2\cdot(\alpha_{PR} - \alpha_R) + \alpha_{ent}. \quad (10)$$

Inserting Equation (8) into Equation (10) yields the off-axis angle $\alpha'_{in}$ of the wave 104 that is first reflected off surface 70, $$\alpha'_{in} = 90° - 2\cdot(\alpha_{PR} - \alpha_R) + \alpha'_{ent} = 90° - 2\cdot(\alpha_{PR} - 2\cdot\alpha_R) - \alpha_{ent}. \quad (11)$$

The way to ensure that ray 104 not be trapped inside the substrate is to maintain the following condition, $$\alpha'_{in} < \alpha_{crit}, \quad (12)$$

wherein, $\alpha_{crit}'$ is the critical angle for total internal reflection inside the substrate. That is, rays having off-axis angles below the critical angle will not be trapped inside the substrate by total internal reflection. Clearly, $\alpha'_{in}$ is maximal for the minimal $\alpha_{ent}$, that is:

$$\alpha'_{in}(\max) = 90° - 2\cdot(\alpha_{PR} - 2\cdot\alpha_R) - \alpha_{ent}(\min) = \quad (13)$$
$$90° - 2\cdot(\alpha_{PR} - 2\cdot\alpha_R) - \alpha_o + \frac{\alpha_{FOV}}{2}.$$

Inserting Equation (13) inside Equation (12) yields $$2\cdot(\alpha_{PR} - 2\cdot\alpha_R) \geq 90° - \alpha_o - \alpha_{crit} + \frac{\alpha_{FOV}}{2}. \quad (14)$$

For illustrating the meaning of the relation given in Equation (14), an optical system having a FOV of 24° is assumed. The optical material of both the optics 66 and the substrate 20 is BK7. Hence, the critical angle is $\alpha_{crit}\sim41.8°$ and the FOV inside the substrate is $\alpha_{FOV}\sim16°$. Due to opto-mechanical considerations, the optics 66 and the substrate 20 are co-aligned, that is, $\alpha_R=0°$. In order to minimize the system's volume, $\alpha_o$ we set is set to be equal to 8°. Inserting these values inside Equation (14) yields $$\alpha_{PR} \geq 45° - \frac{\alpha_{crit}}{2} \sim 24°. \quad (15)$$

For the central wave of the FOV the entrance direction into the optics 66 is:

$$\alpha_{ent} = \alpha_o = 8°. \quad (16)$$

Inserting Equation (16) inside Equation (10) yields $$\alpha_{in} = 90° - 2\cdot\alpha_{PR} + \alpha_{ent} = 50°. \quad (17)$$

Hence, the off-axis angles inside the LOE of the trapped rays over the entire FOV are located in the region $$42° \leq \alpha_{in} \leq 58°. \quad (18)$$

FIG. 18 illustrates an optical system wherein the condition in Equation (14) is fulfilled. Here the ray 112 is first reflected by surface 70 into the undesired direction 114. However, the ray 112 is then reflected by the interface 78 into an angle 116 which is below the critical angle. Therefore, the ray is not trapped inside the substrate 20 but rather coupled out, before penetrating into the LOE, into the region 118, where it can be blocked.

Relating now to the validity of the required angular-sensitivity coating 80 with reference to FIG. 10 above, as explained, this coating should be highly reflective for the first impingement of the ray 78 and transmissive for the second impingement of the ray after reflecting off surface 70. For the parameters given above, the angular region of the first impingement is 74°±8°, and the angular region of the second region is 26°±8°. Therefore, it is desired that the reflectance will be high for incident angles above 66° and very for incident angles below 34°.

FIG. 19 illustrates the reflectance curves of a dichroic coating, designed to achieve the above reflectance characteristics, as a function of the incident angle for both polarizations, at wavelength $\lambda=550$ nm. There are two significant regions in this graph: between 65° and 90° where the reflectance is high, and between 0° and 34° where the reflectance is negligible, for both polarizations.

FIGS. 20 and 21 show the reflectance curves of the same dichroic coating, for the incident angles 34° and 66° respectively, with P-polarized and S-polarized light, as a function of wavelength. While the reflectance of the low-angle ray is negligible over the entire relevant spectrum, the reflectance of the high-angle ray is very high over the entire spectrum. Other dichroic coatings with similar performance for optical systems with different parameters could also be provided.

FIG. 22 illustrates another advantage of the proposed light coupling-in system. Here, three different plane waves, 120, 122 and 124 are coupled into the substrate 20 by the optics 66.

The optical system has the same parameters as those described above. As illustrated in the figure, all of the upper rays of the three waves meet at the boundary line 88. Therefore, though the clear aperture of the entrance surface 72 is around 12 mm, the exit pupil of the coupling-in optics can be set around the boundary line 88 and the aperture of this pupil is approximately 6 mm. Hence, a much simpler design for the collimating optics 6 (FIG. 1) can be used and a more compact optical module can be achieved.

FIGS. 23 and 24 illustrate the opto-mechanical layouts for two different systems employing the front couple-in method described in FIG. 4 and the edge couple-in method, respectively. Both systems comprise a display source 4, a collimating optics 6 and a substrate 20. Not only is the overall optical system for the layout of FIG. 24 simpler, but it also contains a much smaller volume. While the thickness of the system in FIG. 23 is around 34 mm, the system of FIG. 24 is far more compact with an overall thickness is approximately 14 mm.

The present invention can also be used to combine two different scenes. There are numerous uses wherein such a system could be useful. These include a system for pilots or drivers who want to see the front and the side scenes simultaneously, a sportsman who wishes to see different views of the field, a painter who wishes to combine a real scene with his picture, a student who copies text from a board, and many more.

FIG. 25 illustrates a method of combining two different parts of the external scene for viewing by the eye of the user, according to the present invention. A scene image 126 from an oblique direction is coupled by the prism 66 into the substrate 20 and then reflected off the reflective surfaces 22 into the eye 24 of the viewer, at which point its virtual image 128 is combined with the regular scene 129.

Another issue to be taken into account is the orientation of the image in relation to the optics 66. As illustrated in FIG. 8 and in the subsequent figures, the coupled rays are coupled out into the eye of the viewer 24, which is located at the same side of the substrate 20 as the optics 66. In this configuration the partially reflecting surfaces 22 are slanted in the opposite orientation to that of the reflecting surface 64. There are however configurations, as illustrated in FIG. 26, where it is required that the eye of the viewer be located at the opposite side of the substrate. Here, in order to couple the light out of the substrate 20, into the eye 24 of the viewer, the partially reflecting surfaces 22 are slanted in the same orientation as that of the reflecting surface 64. This configuration can be implemented to achieve a much more compact LOE.

As illustrated in FIG. 27, the reflecting surface 64 is utilized not only to couple the incoming light into the LOE, but it acts as the first partially reflecting surface, which couples the light out into the eye 24 of the viewer, in addition. There are some differences between this configuration and those described above. Firstly, unlike the reflectance behavior described above with reference to FIGS. 19 to 21, in this configuration, the reflectance at the lower incident angles should no longer be minimal. That is, in order to properly couple the light out of the LOE at 127, the reflectance of surface 64 at the lower incident angles should be similar to that of the partially reflecting surfaces 22.

FIG. 28 illustrates the reflectance curves of a dichroic coating, designed to achieve the reflectance characteristics, required for the configuration which is illustrated in FIG. 27, as a function of the incident angle, for -polarization, at wavelength 550 nm. As seen, there are two significant regions in this graph: between 65° and 90°, where the reflectance is very high, as before, and between 20° and 34°, where the reflectance is no longer negligible, but rather between 20% and 10% for the incident angles 34° and 20°, respectively.

FIGS. 29 and 30 show the reflectance curves of the same dichroic coating, for the incident angles 34° and 66° respectively, with S-polarized light, as a function of wavelength. While the reflectance of the low-angle ray is approximately 20% over the entire relevant spectrum, the reflectance of the high-angle ray is high over the entire spectrum. Other dichroic coatings with different performances for optical systems with different parameters could also be applicable.

Another modification according to the configuration of FIG. 27, is that the partially reflecting surfaces 22 be located next to surface 64 so as to create an "unbroken" image. Moreover, all of the coupled-out rays which originate from the coupled-in ray 74, should be parallel to each other. As a result, surfaces 22 must be oriented parallel to surface 64.

In each of the configurations described above, a complete optics 66 is attached to the sliced substrate 20. However, there are cases where it would be preferable to attach a trimmed prism to a complete substrate. As illustrated in FIG. 31, a small completing prism 130 is attached to surface 64 of substrate 20 to form a complete rectangular parallelepiped. The substrate is then attached to surface 132 of the trimmed prism 134 to form the LOE of the present invention. The assembly process here is simpler than that of the previous configurations, since the cemented surface is normal to the major parallel surfaces 26 of the LOE. The alignment of the substrate 20 with the trimmed prism 134 is more critical then before. As illustrated, two rays, 136 and 138, emerging from the same plane wave 140 are reflected from two different reflecting surfaces; surface 64, which is now embedded inside the substrate 20 and surface 68 which is the external surface of the trimmed prism 132, respectively. So as to avoid double images, it is necessary that the trapped rays 136 and 138 will be coupled to the same direction. Hence, it is necessary that surfaces 64 and 68 be embedded along the same common plane.

In each of the configurations illustrated above, the trapped rays are coupled out of the substrate through one of the two major surfaces of the LOE. However, there are applications where the eye of the viewer, or another detector, is located next to the edge of the substrate 20. As illustrated in FIG. 32, this can be achieved by attaching another prism 142, not necessarily identical to optics 66, to the opposite side of the substrate 20. As illustrated, the trapped ray 144 is coupled out by the second prism 142 into the eye 24 of the viewer, which is located at the opposite side of the LOE, with respect to the display. Naturally, the reflecting characteristics of the interface surface 146, between substrate 20 and the second prism 142, can be similar to those described above with reference to the first optics 66.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An imaging optical device, comprising:
a light source;
a light-transmitting substrate having at least two major surfaces parallel to each other and two edges;
an optical element having at least a first, a second, and a third surface for coupling light waves from said light source into said substrate by total internal reflection,
wherein at least one of said edges is slanted with respect to said major surfaces, wherein at least a portion of said first surface for coupling light into the substrate is in contact with, or located adjacent to, said slanted edge, and wherein said coupled light waves enter the substrate through said slanted edge,
characterized in that said light source emits light waves located in a given field of view, said light waves are collimated to form plane waves, and that the trapped rays from any of said light plane waves are coupled inside the substrate at the same direction.

2. The optical device as claimed in claim 1, further comprising at least one partially reflecting surface located in said substrate, which surface is non-parallel to the major surfaces of said substrate.

3. The optical device as claimed in claim 1, wherein said optics for coupling light into the substrate is a prism.

4. The optical device as claimed in claim 3, wherein at least a portion of said first surface of said prism is slanted with respect to said second surface of the prism.

5. The optical device as claimed in claim 4, wherein said first surface of the prism is cemented with optical cement to the slanted edge of said substrate to form a boundary line.

6. The optical device as claimed in claim 1, wherein said optical element is disposed to form an air gap adjacent to the slanted edge of said substrate, to form an air gap therebetween.

7. The optical device as claimed in claim 4, wherein said first surface of the prism is located parallelly to the slanted edge of said substrate.

8. The optical device as claimed in claim 4, wherein said second surface of the prism and one of said major surfaces of said substrate are attached together at their apexes.

9. The optical device as claimed in claim 4, wherein said second surface of the prism is co-aligned with one of the major surfaces of said substrate.

10. The optical device as claimed in claim 8, wherein a small off-set angle is set between said second surface of the prism and one of the major surfaces of said substrate.

11. The optical device as claimed in claim 1, wherein said light source is a two-dimensional light source.

12. The optical device according to claim 5, wherein a single point on the boundary line between the slanted edge of said substrate and the surface of said prism is illuminated by two different rays from a single illuminating light wave emerging from said display source that enter said prism at two different locations.

13. The optical device as claimed in claim 11, wherein said display source is disposed at an angle to the prism to cause one of said rays to directly illuminate the boundary line, and the second of said rays to be reflected first by the surfaces of said prism and then by the one of the major surfaces of said substrate before illuminating said boundary line.

14. The optical device as claimed in claim 5, wherein either said first surface of the prism, the slanted edge, or both, are coated with an angular sensitive coating.

15. The optical device as claimed in claim 14, wherein said angular sensitive coating has a negligible reflection for one part of the angular spectrum and a significant reflection for other parts of the angular spectrum.

16. The optical device as claimed in claim 14, wherein said angular sensitive coating has low reflectance at low incident angles and high reflectance at high incident angles.

17. The optical device as claimed in claim 14, wherein said angular sensitive coating causes the entire field-of-view of a predefined image to be trapped inside said substrate by internal reflections.

18. The optical device as claimed in claim 14, wherein said angular sensitive coating is calculated to cause a pre-defined image to reach the eyes of an observer.

19. The optical device as claimed in claim 2, wherein there is provided an array of partially reflecting surfaces coupling the light waves trapped by internal reflection out of said substrate.

20. The optical device as claimed in claim 11, further comprising a collimating lens positioned between the display source and said optical element.

21. The optical device as claimed in claim 2, wherein there is provided a plurality of partially reflecting surfaces located in said substrate parallelly disposed with respect to each other.

22. The optical device as claimed in claim 2, wherein the slanted edge of said substrate is inclined at a different orientation than that of said at least one partially reflecting surface.

23. The optical device as claimed in claim 2, wherein the slanted edge of said substrate is inclined at a similar orientation than that of said at least one partially reflecting surface.

24. The optical device as claimed in claim 2, wherein the slanted edge of said substrate is parallel to said at least one partially reflecting surface.

25. The device as claimed in claim 1 wherein said optical device combines two different aspects of an external scene.

26. The optical device as claimed in claim 1, wherein the other of said edges is slanted with respect to a major surface of said substrate.

27. The optical device as claimed in claim 26, further comprising a second optical element for coupling light out of said substrate located adjacent to said other slanted edge.

28. The optical device as claimed in claim 27, wherein said second optical element for coupling light out of said substrate is a prism.

29. The optical device as claimed in claim 28, wherein one surface of said prism contacts, or is located adjacent to, the slanted edge of said substrate.

30. The optical device as claimed in claim 27, wherein said other slanted edge is located opposite to the first slanted edge.

31. The optical device as claimed in claim 3, wherein said prism is composed of two different prisms.

32. The optical device as claimed in claim 31, wherein one of said prisms is trimmed and the trimmed prism contacts, or is located adjacent to, said slanted edge.

33. The optical device as claimed in claim 32, wherein the substrate and said trimmed prism together form a complete rectangular parallelepiped.

34. The optical device as claimed in claim 32, wherein said trimmed prism is cemented onto said substrate.

35. The optical device as claimed in claim 34, wherein the cemented contacting surfaces between the substrate and the trimmed prism extends normally to said major surfaces.

36. The optical device as claimed in claim 11, wherein said display source is disposed at an angle to the prism to cause a ray emerging from said display source to directly illuminate the boundary line and a second ray emerging from said display source to be reflected first by the surfaces of said prism and then by one of the major surfaces of said substrate before illuminating a boundary line of said substrate.

37. The optical device as claimed in claim 1, wherein said coupled light waves are reflected by said second surface of the optical element before entering the substrate through said slated edge.

38. The optical device as claimed in claim 37, wherein said coupled light waves are reflected by said first surface of the optical element before being reflected by said second surface of the optical element.

39. The optical device as claimed in claim 37, wherein said coupled light waves enter the optical element through said third surface.

\* \* \* \* \*